United States Patent
Guercioni

(10) Patent No.: US 8,918,986 B2
(45) Date of Patent: Dec. 30, 2014

(54) METHOD FOR MAKING A HIGH FILL FACTOR STATOR FOR AN ELECTRICAL MACHINE

(75) Inventor: Sante Guercioni, Teramo (IT)

(73) Assignee: Tecnomatic S.p.A., Teramo (IT)

( * ) Notice: Subject to any disclaimer, the term of this patent is extended or adjusted under 35 U.S.C. 154(b) by 49 days.

(21) Appl. No.: 13/387,717

(22) PCT Filed: Mar. 3, 2010

(86) PCT No.: PCT/IT2010/000092
§ 371 (c)(1),
(2), (4) Date: Jan. 27, 2012

(87) PCT Pub. No.: WO2011/108013
PCT Pub. Date: Sep. 9, 2011

(65) Prior Publication Data
US 2012/0324717 A1 Dec. 27, 2012

(51) Int. Cl.
*H02K 15/00* (2006.01)
*H02K 3/34* (2006.01)
*H02K 15/10* (2006.01)
*H02K 15/12* (2006.01)

(52) U.S. Cl.
CPC ............... *H02K 3/345* (2013.01); *H02K 15/10* (2013.01); *H02K 15/12* (2013.01)
USPC ............................... 29/596; 29/732; 310/201

(58) Field of Classification Search
USPC .................. 29/596–598, 605–606, 732–736, 29/840–842, 564.1–564.4; 310/101–205; 242/432–432.6
See application file for complete search history.

(56) References Cited

U.S. PATENT DOCUMENTS

| | | | |
|---|---|---|---|
| 4,853,565 A * | 8/1989 | Elton et al. | 310/45 |
| 4,918,801 A * | 4/1990 | Schwarz et al. | 29/596 |
| 5,258,681 A * | 11/1993 | Hibino et al. | 310/214 |
| 5,664,317 A * | 9/1997 | Ponzio et al. | 29/596 |
| 6,040,650 A | 3/2000 | Rao | |
| 6,124,660 A * | 9/2000 | Umeda et al. | 310/215 |
| 6,208,060 B1 * | 3/2001 | Kusase et al. | 310/216.069 |
| 6,389,678 B1 | 5/2002 | Ackermann | |
| 6,674,211 B2 * | 1/2004 | Katou et al. | 310/215 |
| 6,989,622 B1 | 1/2006 | Chen | |
| 7,788,790 B2 * | 9/2010 | Neet | 29/596 |
| 7,941,910 B2 | 5/2011 | Guercioni | |
| 8,296,926 B2 * | 10/2012 | Wang et al. | 29/596 |
| 2002/0089250 A1 | 7/2002 | Naka et al. | |
| 2012/0248926 A1 * | 10/2012 | Guercioni | 310/215 |

FOREIGN PATENT DOCUMENTS

| | | | |
|---|---|---|---|
| DE | 35 40 543 | | 1/1987 |
| EP | 0 321 223 | | 6/1989 |
| JP | 58157349 | * | 9/1983 |
| JP | 7 067301 | | 3/1995 |
| JP | 2003116241 | | 4/2003 |
| JP | 2003308315 A | | 10/2003 |

* cited by examiner

*Primary Examiner* — Minh Trinh
(74) *Attorney, Agent, or Firm* — Tarter Krinsky & Drogin LLP

(57) ABSTRACT

A method (20) is described for making a stator (1) of an electric machine, the stator comprising a stator core (2), the stator core comprising a main body and a plurality of slots (8) which are axially extended inside the main body and are adapted to receive bar conductors. (5, 5', 5") of a bar stator winding. The method (20) comprises the steps of : inserting (23) at least one preshaped insulating sheet (10) inside at least one of said slots (8); hot shaping (26) said preshaped insulating sheet (10) inside the slot, along the entire axial extension of the slot (8) or along a substantial portion thereof, in order to confer form regularity and stability to said preshaped insulating sheet (10). Through the described process, it is possible to make stators with bar winding having a stator core with relatively high height and slot fill factor.

7 Claims, 7 Drawing Sheets

METHOD FOR MAKING A HIGH FILL FACTOR STATOR FOR AN ELECTRICAL MACHINE

Cross-Reference to Related Applications:

This application is based on International Application No. PCT/IT2010/000092, filed on Mar. 3, 2010, the contents of which are incorporated herein by reference.

The present description refers to a method and to an apparatus for making a stator for an electric machine. The present description also refers to a stator for an electric machine with high fill factor.

It is known to make stators for electric machines having a stator core in which a plurality of slots are provided, and also comprising a plurality of bar conductors inserted in the aforesaid slots and, differently connected to each other in order to form one or more stator windings. The aforesaid stator windings with bar conductors are commonly called bar stator windings.

In order to make the aforesaid stators, in order to ensure a correct insulation between separate bar conductors housed in a same slot and/or between the bar conductors and the inner walls of the slots of the stator core, an operation is provided for inserting, inside each slot, a respective sheet of electrically insulating material, for example made of composite material. Based on contingent needs, on the slot shape and type, on the number of bar conductors to be inserted in a same slot, it is known to provide that the aforesaid insulating sheet is suitably preshaped before the insertion in the respective slot. For example, "C", "U", "S" and "Z"-shaped preshaped insulating sheets are known (among other shapes). Based on contingent needs, it is also possible to provide for inserting, in a same slot, two or more preshaped insulating sheets.

Normally, and particularly but not exclusively if the method of insertion of the bar conductors inside the slots is an at least partially automated process, the preshaped insulating sheets are inserted in the slots before filling the slots with the conductors. In the prior art methods, there may be provided, after having inserted the preshaped insulating sheets in the slots, an operation of flaring end portions of the preshaped insulating sheets which axially project beyond the stator core, at least from the insertion side of the bar conductors. Such portions thus flared act as stop elements provided for preventing the insulating sheets from being dragged along the slots during the insertion of the bar conductors inside the slots, in addition to acting as guide for the bar conductors during their insertion in the stator core.

In the patent application published as U.S. Pat. No. 2009/0265909, a method for making a stator is described, comprising a step of filling the slots of a stator core with respective preshaped insulating sheets; a step of drawing, from a twisting device, the entire winding comprising a plurality of bar conductors; and a step for simultaneously inserting the conductors of the winding inside the slots.

It is known that the performance of an electric machine depends on the slot fill factor of the stator core and it is desirable that such factor be as high as possible. This need nevertheless contrasts with the, difficulties and the problems that can be encountered during the insertion of the bar conductors inside the slots, if these have been previously equipped with one or more respective insulating sheets. Indeed, in order to obtain a high fill factor, the bar conductors must have external size which fills the residual space in the slots as much as possible after the insertion of the insulating sheets. The limit of this optimal sizing is given by the sliding friction resistance that the bar conductors encounter during their insertion in the slots. In particular, if the slots, and hence also the bar conductors, have a relatively high longitudinal extension, for example greater than 10 cm, particularly but not exclusively if one wishes to employ an automated slot filling process, and particularly but not exclusively if such filling is simultaneous for all or nearly all the slots, it is necessary to maintain the size of the cross section of the bar conductors under certain limits, such that the residual space (i.e. the space available of the slot after the insertion of the preshaped insulating sheet therein) allows avoiding an undesired blocking of the bar conductors during their insertion in the slots. This problem is particularly but not exclusively felt if the conductors have a relatively small cross section or at least a cross section with a geometry which has a relatively small minimum dimension. In this case, in fact, there is the risk that the blocking of the bar conductors causes an undetermined bending of the same bar conductors, which in an automated method with simultaneous insertion of a plurality of bar conductors in the slots would lead to the blocking of the method and the production of bar conductor scraps with no possibility of recycling.

In view of the abovementioned limits, it is not currently possible to make' stators with slot fill factor greater than 80% (intended as the ratio between the cross section of the bar conductor without insulating enamel and the cross section of the slot without insulating sheet), and in particular greater than 85%, which have a length equal to or greater than 100 mm, and in particular greater than 150 mm and even more so greater than 200 mm, particularly but not exclusively if the cross section of the bar conductor has a geometry with minimum dimension (measured with inclusion of a possible insulating enamel) less than or equal to 3.3 mm and in particular less than 3.0 mm, for example equal to 2.8-2.9 mm.

There is therefore the need to provide a method for making a stator for an electric machine which is capable of remedying the drawbacks described above with reference to the prior art.

The object of the present description is to provide a method which allows meeting the above-indicated need.

Such object is carried out by means of a method for making a stator as generally defined in the attached first claim in its most general form, and in the dependent claims in several particular embodiments.

A further object of the present invention is that of providing an apparatus for making a stator and in particular an apparatus for conferring form regularity and stability to the preshaped insulating sheets of, a stator.

A further object of the present invention is that of providing a stator with bar conductors which has a high slot fill factor.

The invention will be better understood from the following detailed description of its embodiments made as exemplifying and hence in no manner limiting in relation to the drawing set, in which:

FIG. 1 schematically shows a side view of a stator embodiment for electric machine, comprising a stator core and a bar stator winding;

FIG. 2 schematically shows a top view of a portion of a stator core, in which two slots are shown that are intended to be filled with preshaped insulating sheets and bar conductors;

FIG. 3 schematically shows a top view of a portion of the stator core, in which two slots are visible that are filled with insulating sheets and bar conductors;

Figure 1:
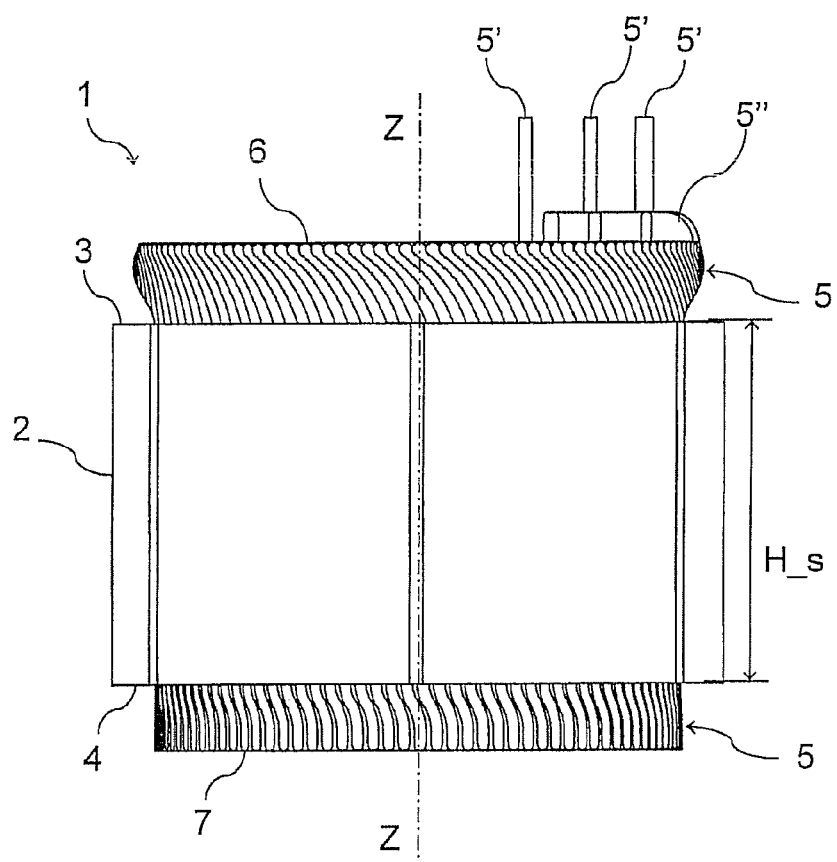

In the figures, equivalent or similar elements are indicated with the same numeric references. For the purposes of the present invention, by "flat" or "square" bar conductor, a bar conductor is intended having four substantially flat sides, each joined at adjacent sides, typically by a rounded corner.

Hence, the words "flat" or "square" or equivalent words used for describing the cross section of a bar conductor are used in a general sense and must not be interpreted to exclude the fact that such bar conductors have significantly rounded corners which join the substantially flat sides. The expression "flat conductor" is intended in the sense that the conductor has two opposite sides, whose distance is greater than the distance between the remaining two opposite sides. For the purposes of the present description, the expression "rectangular conductor" is intended as generalization of flat conductor and square conductor, the square conductor being a special rectangular conductor case in which the four sides have the same dimensions.

With reference to the figures, a stator is indicated in its entirety with 1, such stator comprising a stator core 2. For example, the stator 1 is the stator for an electric machine such as an electric motor, e.g. for an electric or hybrid drive vehicle.

It is clear that such stator can also be used in an electric machine employed as a generator or employed for alternatively performing the function of motor and the function of generator. Only the stator of such electric machine was represented in the attached figures, since it is deemed that the remaining parts of an electric machine or generally of an electric or hybrid drive vehicle are widely known by a man skilled in the art.

In a per se known manner, the stator core 2 comprises a laminated tubular main body, for example made of a magnetic material, that is axially extended (Z-Z axis) between two opposite faces 3,4.

The main body of the stator core 2 comprises a plurality of slots 8 which are axially extended into the thickness of the main body and which are adapted to receive rectangular bar conductors 5, 5', 5" which altogether form at least one bar stator winding. In accordance with one embodiment, the bar rectangular conductors 5, 5', 5" are superficially covered with a layer of insulating material, such as, for example, an insulating resin enamel.

In accordance with one embodiment, the rectangular bar conductors 5, 5', 5" comprise a first set of standard conductors 5, which are U-shaped bar conductors (also called "hairpin conductors"), and a second set of special conductors 5', 5" which comprise for example terminals 5' or jumpers 5". The U-shaped conductors have a fold portion 6 which projects from a face 3 of the stator core 2, or insertion face 3, and two free end portions 7 which project from the other face 4 of the stator core 2, or welding face 4.

The distance between the two faces 3,4 defines the height H_s or the axial extension of the stator core. In accordance with one embodiment, such height H_s is greater than or equal to 100 mm. In accordance with a further embodiment, such height H_s is greater than or equal to 150 mm such as, for example, equal to about 160 mm. In accordance with a further embodiment, such height H_s is greater than or equal to 200 mm.

That described up to now is known by the man skilled in the art of the field and therefore will not be further detailed.

In accordance with one embodiment, the aforesaid bar conductors 5, 5', 5" are copper conductors and are flat conductors, so that they have a pair of opposite faces that are distant from each other by more than the distance between the two remaining opposite sides. In accordance with one embodiment, the rectangular bar conductors have a cross section with a geometry having minimum dimension (also including the possible insulating enamel) less than or equal to 3.5 mm. In accordance with one embodiment, such minimum dimension (also including the possible insulating enamel) is less than or equal to 3.0 mm. For example, such minimum dimension (also including the possible insulating enamel) is equal to 2.9 mm or 2.8 mm. In the case of rectangular bar conductors, this implies that at least two opposite sides of said conductors have thickness comprised in the aforesaid range and the remaining two opposite sides have arbitrary sizes, which can be comprised or not comprised in the aforesaid range.

Figure 2:
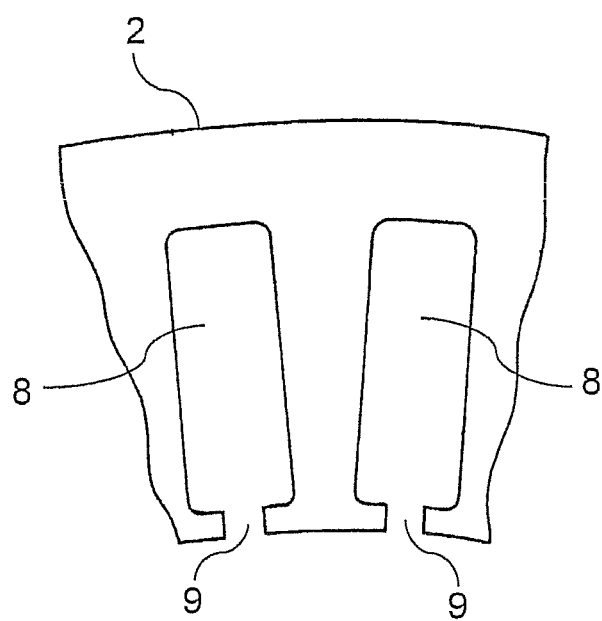
Figure 3:
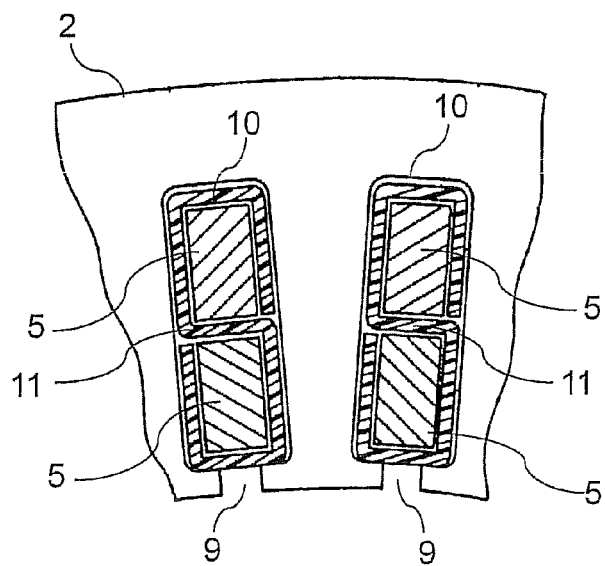

With reference to the FIGS. 2 and 3, each slot 8 of the stator core 2 is crossed by at least one of the aforesaid bar conductors 5, 5', 5" and hosts a sheet 10, or sheath 10, made of insulating material. As is known to a man skilled in the art, the characteristics of such insulating sheet 10 are conveniently selected in relation to the electric power at play and in relation to the operating temperature.

In accordance with one possible exemplary and non-limiting embodiment, the insulating sheet is a multilayer sheet comprising two TufQUIN™ (3M™) layers that are coupled, e.g. glued, to the two opposite faces of a central polyester sheet.

In accordance with one possible embodiment, the slots 8 are of open type, i.e. they have an opening 9 which faces towards the interior of the main tubular body of the core 2.

In accordance with a specific and non-limiting embodiment selected from among the many possibilities, each slot 8 is crossed by at least one pair of rectangular bar conductors 5, 5', 5" and each slot hosts a sheet of insulating material with an S-shaped cross section. In accordance with one embodiment, as shown in FIG. 3, if the bar conductors are flat, the two bar conductors inside a same slot are aligned along their respective short side.

If the slots 8 are each crossed by more than two bar conductors 5, 5', 5", it is possible to provide for inserting more than one S-shaped preshaped insulating sheet 10 for each slot 8, for example one S-shaped preshaped insulating sheet 10 for each pair of bar conductors which cross the slot 8. In an alternative embodiment not shown in the figures, it is possible, for example, to insert a single insulating sheet in a single U-shaped preshaped insulating sheet, even in the presence of more than one pair of bar conductors in the slot 8, in which such insulating sheet is therefore set for insulating the bar conductors from the internal walls of a slot but not to insulate the bar conductors, that are housed inside a same slot, from each other. In this case, such conductors will clearly be equipped with suitable external insulation lining.

In further embodiments, not represented in the figures, it is possible to provide that the preshaped insulating sheets 10 inserted in the slots have a cross section which rather than being "S"-shaped is shaped as a ring, "C"-shaped, "Z"-shaped, etc.

For the purposes of the present description, by preshaped insulating sheet it is intended an insulating, sheet which was subjected before insertion in the slot to a manufacturing method adapted to confer a shape to the sheet that is different from flat or approximately flat form. The manufacturing methods of the aforesaid type are known to a man skilled in the art and generally are such to provide folding operations of the insulating sheets adapted to confer these, starting from a flat or approximately flat form, an "S"-, "C"-, "U"- and "Z"-shaped form etc. By approximately flat form, it is intended form different from exactly flat form, such as, for example, a slightly curved form, that the insulating sheet can take on e.g. due to storage of the latter as part of a tape wound around a support.

Figure 4:
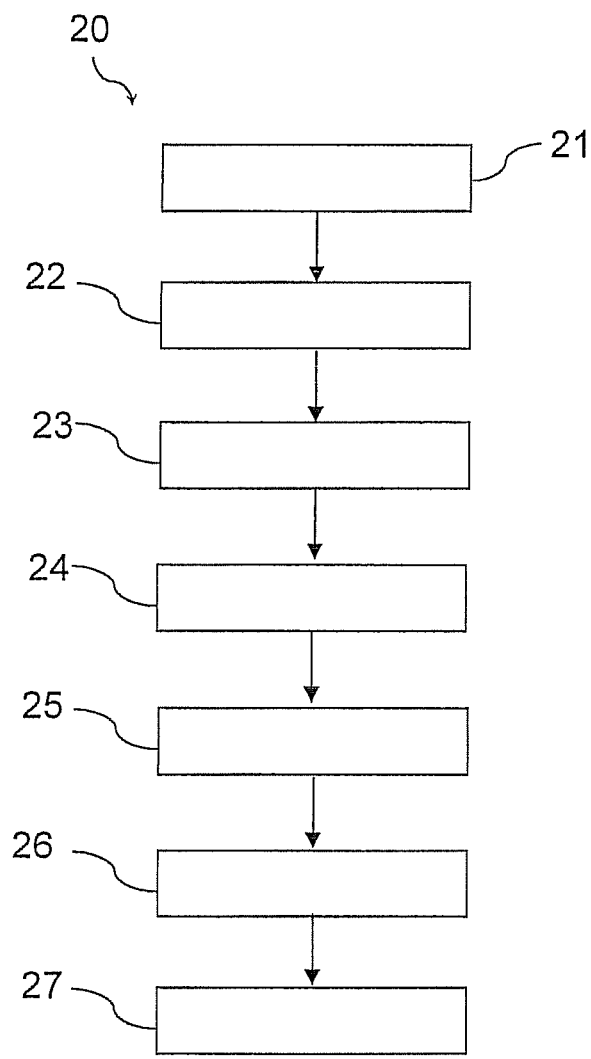
FIG. 4 shows a flow diagram of a method for making the stator of FIG. 1.

In FIG. 4, the simplified flow chart is shown of a method embodiment 20 for making a stator 1 as described above.

The method 20 comprises a step of prearranging 21 a bar stator winding formed by bar conductors 5, 5', 5" intended to be inserted inside the slots 8 of the stator core 2. In a per se known manner, the prearranging step comprises the operations of pre-forming the bar conductors, inserting these in a forming device, and twisting the bar conductors by means of the forming device. In a per se known manner, the prearranging step comprises an operation of drawing all the bar conductors together from the forming device, as a non-limiting example via an extraction device and a clamp-grip device as described in the patent application U.S. Pat. No. 2009/0265909.

The method 20 also comprises a step 22 of inserting at least one preshaped insulating sheet 10 (for example "S"-preshaped or "U"-preshaped or "Z"-preshaped etc.) inside at least one of the slots 8. In accordance with a preferred embodiment, the insertion step 22 comprises a step of simultaneously or sequentially inserting, inside all the slots 8, at least one respective preshaped insulating sheet 10.

The method 20 also comprises a step 25 of hot shaping, inside the slot 8, said at least one preshaped insulating sheet 10, along the entire axial extension of the slot 8 or along a substantial portion thereof. For the purposes of the present description, by substantial portion it is intended a portion of length greater than or equal to 75% of the slot depth. Preferably, the aforesaid step 25 of hot shaping is simultaneously carried out for all the preshaped insulating sheets 10 inserted inside the slots 8 of the stator core 2.

For the purposes of the present description, by hot shaping a preshaped insulating sheet 10 inside the slot 8 it is intended an operation that is such to modify the shape of the preshaped insulating sheet 10 after the insertion of the latter in the slot 8, in order to confer this with a desired and stabilized form. In other words, the step 25 of hot shaping is aimed to confer a certain form regularity and stability to the preshaped insulating sheet 10 such that the latter takes on, inside the respective slot 8, a profile which essentially optimizes the residual space inside the slot 8 in order to facilitate the insertion of the bar conductors 5, 5', 5". Such optimization is aimed to improve the adhesion of the insulating sheet 10 to the inner walls of the slot 8 and/or create precise folds in the insulating sheet 10 and/or flatten possible irregularities on the surface of the insulating sheet 10. It is observed that by advantageously actuating the aforesaid hot shaping operation inside the slot, it is possible to have the inner walls of the slot 8 which act as an abutment during such operation.

In accordance with one embodiment, the hot shaping step 25 comprises an operation of pressing the aforesaid at least one preshaped insulating sheet 10 inside the respective slot 8 via insertion inside the latter of a preheated shaping tool 53 and subsequent removal thereof. During such insertion and subsequent removal, there is therefore a sliding of the hot shaping tool 53 on a free surface of the insulating sheet 10, with abutment against the inner walls of the slot 8, aimed to optimize the profile of the preshaped insulating sheet 10 shape inside the slot 8. In accordance with one embodiment, before the hot shaping step 25, the method 20 comprises a step 23 of preheating the shaping tool 53 to a temperature greater than or equal to 120° C. and preferably greater than or equal to 150° C.

In accordance with one embodiment, the shaping tool 53 comprises at least one bar 53 and the hot shaping step comprises an operation of inserting the bar 53 inside a respective slot by making the bar 53 move forward with respect to the stator core 2 and a subsequent operation of freeing the slot 8 from the bar 53 by making the bar move backward with respect to the stator core 2.

In accordance with one embodiment, preferred and non-limiting, the bar 53 has a length greater than or equal to the axial extension depth of the slot 8 and is intended to be inserted in the slot 8 on the insertion side 3, in order to cross through the slot 8 and arrive at an end stop position in which a free end portion of the bar 53 projects beyond the welding face 4 of the stator core 2. Clearly, in this case the hot shaping occurs along the entire extension of the slot 8.

In accordance with one embodiment, if the slot 8 is intended to house several bar conductors 5, 5', 5" of the stator winding and if the preshaped insulating sheet 10 has one or more intermediate dividers 11 (as occurs, for example, when one uses a preshaped insulating sheet with "S"-shaped transverse profile—FIG. 3), the shaping tool 53 comprises a number of bars 53 equal to the number of bar conductors 5, 5', 5" intended to be housed inside the same slot 8. For example, if each slot 8 is intended to house two bar conductors 5, 5', 5" and a preshaped insulating sheet 10 is provided for with essentially S-shaped transverse profile, the hot shaping tool 53, as in the represented embodiment, will comprise two bars 53 intended to be simultaneously inserted, inside a same slot 8.

In accordance with a preferred embodiment, the method 20 comprises a step 24 of flaring an end portion 10' of the insulating sheet 10 projecting from the stator core 2, from the side of an axial end of said core, and preferably from the side of the insertion face 3. The flaring step 24 comprises an operation of inserting a conical flaring element 54 inside said projecting end portion 10'. More preferably, with reference to FIG. 6, the shaping tool 53 is slidably received inside a hollow housing seat 55 which terminates with the conical flaring element 54, which is therefore a conical and hollow flaring element 54 being equipped with an end opening intended to be crossed by the shaping tool 53. In accordance with one embodiment, the flaring element 54 is conveniently a preheated element. In addition, it is also clear that the flaring, step 24 can be simultaneously carried out for all the insulating sheets 10 housed in the stator core 2, by executing such, step via a circular formation comprising a plurality of conical flaring elements 54.

The flaring step 24 can be executed before the hot shaping step 25 or, in accordance with a preferred embodiment, simultaneously or at least with partial time overlapping with the hot shaping step 25. In the latter embodiment, with reference to FIG. 5, it is in fact observed that it is possible, for example, to make the shaping tools 53 slide inside the seat 55 while the conical flaring element 54 is in abutment on the projecting portion 10' of the insulating sheet 10.

Returning the flow diagram of FIG. 4, in accordance with one embodiment, after the hot shaping step 25 the method 20 comprises a step of inserting 26 all the bar conductors 5, 5', 5" inside the respective slots, as prearranged in the prearranging step 21. Due to the fact that there is a hot shaping step of the insulating sheet 10 in the slot 8, one will be able appreciate, as already anticipated, that the insertion step 26 is facilitated; such step is also possible with bar conductors of relatively high length and relatively low cross section. At the same time, the insertion step is such to obtain a high fill factor of the slots 8.

In accordance with one embodiment, the method 20 comprises a subsequent step for folding and welding 27 end portions of the bar conductors which project beyond the welding face 2 of the stator core 2. Such step 27 is per se known to a man skilled in the art and for this reason will not be further detailed in this document.

Figure 5:
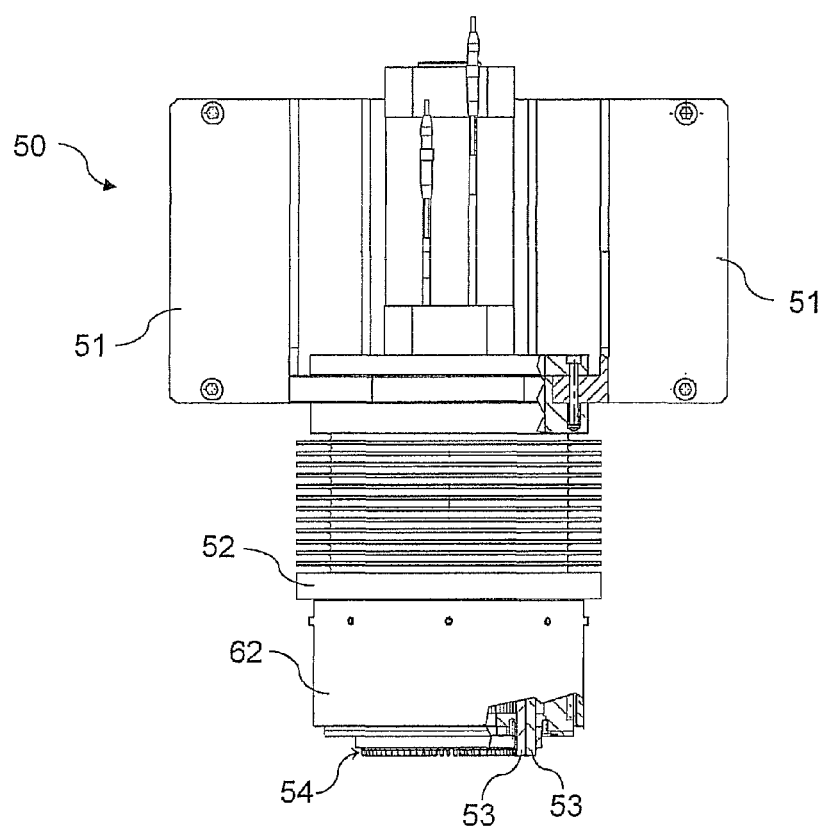
FIG. 5 shows a front elevation plane view, with some sectioned parts, of an apparatus employable for actuating several steps of the method of FIG. 4.
Figure 6:
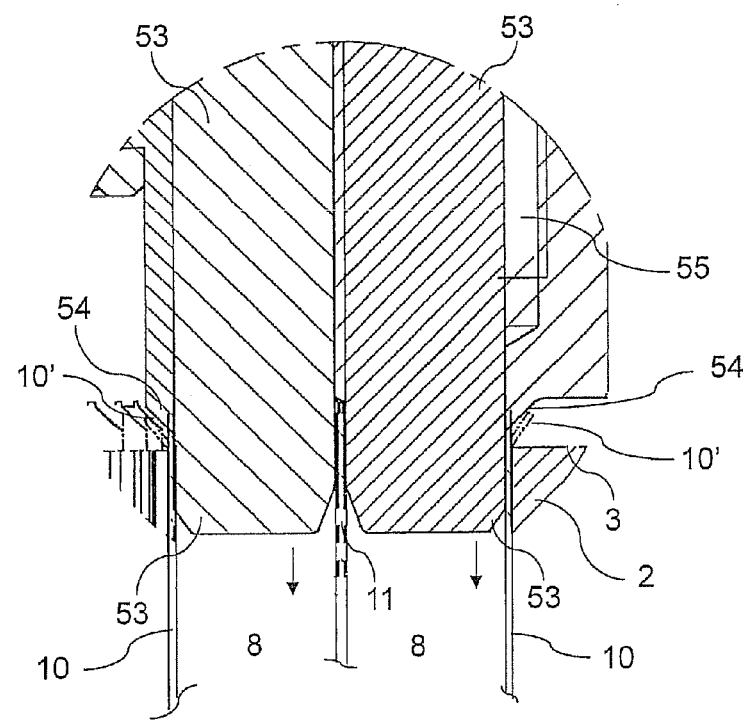
FIG. 6 shows a plane view in section of an enlarged part of the apparatus of FIG. 5.
Figure 7:
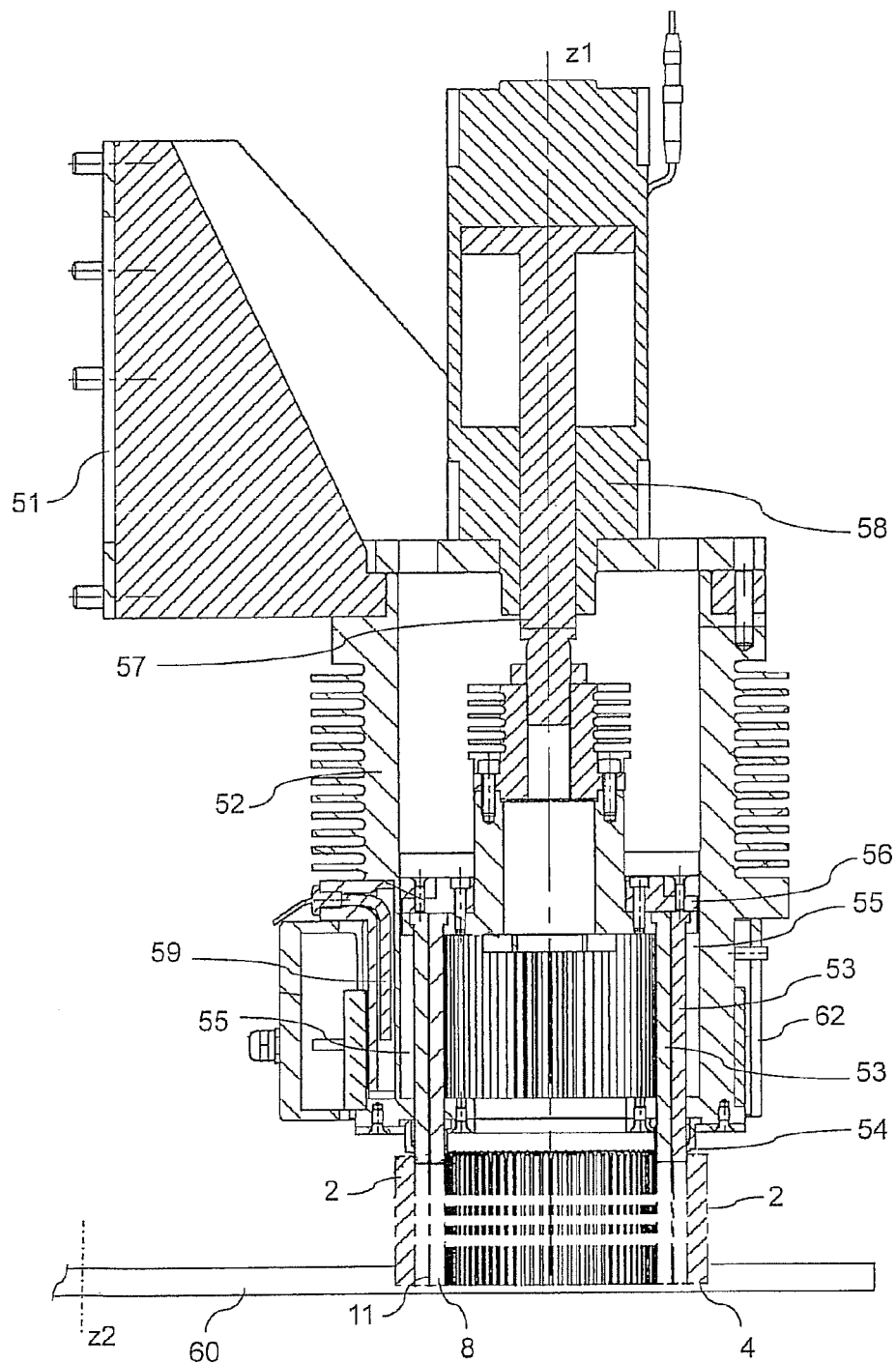
FIG. 7 shows a plane view in side section of the apparatus of FIG. 5.

With reference to FIGS. 5-7, an embodiment of an apparatus 50 for making a stator will be described, and in particular a shaping apparatus 50 for the shape stabilization of at least one preshaped insulating sheet, by means of which the hot shaping step 25 can be carried out of the preshaped insulating sheets after the insertion thereof in the stator core. In accordance with the embodiment which will be described, the shaping apparatus 50 is such to also carry out the preheating 23 and flaring 24 steps described above.

The apparatus 50 comprises a tubular housing 52 adapted to house the, hot shaping tools 53. The tubular housing 52 is for example integral with a support plate provided to suspend the apparatus 50 at a support crossbar or arm (not shown in the figures), for example vertically movable (along Z-Z axis) with respect to an abutment and work surface 60. The tubular housing 52 in particular hosts a plurality of hot shaping bar pairs 53 circumferentially arranged around a work axis z1 of the apparatus 50. The work axis z1 in the functioning of the apparatus 50 is aligned with the Z-Z axis of the stator core 2. In the embodiment, each pair of hot shaping bars 51 comprises a first and a second bar 52, close to each other and radially aligned.

The hot shaping bars 53 are integral with a same support plate 56 that is axially movable along the work axis z1 by means of a linear motor—which can be electric, pneumatic or hydraulic—comprises a slidable piston 57 and a roll 58.

The hot shaping bars 53 are housed in a housing seat 55 which is operatively heated by a distributed heating element 59 provided for in the equipment 20. Therefore, when the bars 53 are housed in the housing seat 55, these are preheated due to the distributed heating element 59. For example, such bars are brought to a temperature greater than or equal to 120° C., and for example to a temperature comprised between 120° C. and 160° C. and preferably equal to 150° C. Nevertheless, it is observed that the temperature represents a design parameter that can be set by a man skilled in the art based on the characteristics of the preshaped insulating sheet 10—in order to obtain the desired hot shaping effect.

Once a desired operating temperature has been attained, the shaping bars 52, by means of the motor 57, 58, can be axially moved into a group for slidably penetrating inside the respective slots 8 of the stator core 2. This in order to carry out the hot shaping step of the preshaped insulating sheets 10 already described above.

From the results of experimental tests carried out, it is observed that it is not necessary for the shaping bars 53 to stay for a long time inside the slots 8. Rather, a brief stop in the slots 8 is sufficient (for example, on the order of 0.5-2 seconds and preferably equal to 1 second) after the insertion and before the extraction of the shaping bars 53.

The apparatus 20 can be conveniently equipped with at least one circular array comprising a plurality of tubular and conical flaring elements 50 which can be crossed by the shaping bars 53 in order to flare the projecting end portions 10' of the insulating sheets 10, so as to carry out, with one same apparatus 50, both the flaring step 24 and the hot shaping step 25 in the slot. It is also possible to advantageously provide that the distributed heating element 59 is also employed for heating the tubular conical flaring elements 54.

Finally, with reference to FIG. 7, it is observed that the apparatus 20 can be provided with a support and work surface 60 adapted to sustain the stator core 20 in abutment. In a per se known manner, such surface 60 can be a surface rotating around a vertical axis z2 and the apparatus 20 can indiscriminately constitute part of specific machine or alternatively it can represent one of a plurality of work stations angularly spaced from each other. In such stations, the stator core 2 can be borne by rotating the surface 60 in order, to be subjected to several separate working steps.

Tests in the field have shown that through a method and apparatus as described above, it is possible to fully achieve the pre-established goals, since it is possible to make stators having a height (Z-Z axis), or even an "axial extension" that is relatively high and at the same characterized by a high slot fill factor, since via the hot shaping of the preshaped insulating sheets in the slot, it is possible to: stabilize the form and optimize the profile of the preshaped insulating sheets directly in the slots, and facilitate the insertion of the bar conductors 20 inside the slots 8.

In particular, by means of tests on the field, a stator was made:
- with a stator core having a height greater than or equal to 100 mm;
- in which the fill factor of the slots 9, intended as the ratio between the cross section of a slot without insulating sheet 10 and the total electrically conductive section of the at least one bar conductor housed therein, is greater than or equal to 80%.

In particular, a stator of the aforesaid type was achieved whose height is greater than or equal to 150 mm, and in particular greater than or equal to 200 mm.

In particular, a stator of the aforesaid type was achieved in which the fill factor is greater than or equal to 85%.

In particular, a stator of the aforesaid type was achieved in which the bar conductor has a cross section with a geometry having a minimum dimension less than or equal to 3.5 mm and in particular is less than or equal to 3 mm.

Of course, a man skilled in the art can make numerous modifications and variants to the above-described method and apparatus in order to meet specific and contingent needs; all modification and variants are moreover contained in the protective scope of the invention as defined by the following claims.

The invention claimed is:

1. Method for making a stator of an electric machine, the stator comprising a stator core, the stator core comprising a main body and a plurality of slots which are axially extended inside the main body and are adapted to receive bar conductors of a bar stator winding, the method comprising the steps of:
   inserting at least one preshaped insulating sheet inside the respective slot of said plurality of slots;
   hot shaping the preshaped insulating sheet inside the respective slot, along the entire axial extension of the slot, in order to confer form regularity and stability to said preshaped insulating sheet; and
   inserting at least a bar conductor of the bar stator winding into said at least one respective slot in order to assemble said stator;
   wherein the hot shaping step comprises pressing the preshaped insulating sheet inside the slot against the walls of the slot by inserting a preheated shaping tool inside the slot and subsequently removing such tool.

2. Method according to claim 1, comprising a step of preheating the shaping tool to a temperature greater than or equal to 120° C.

3. Method according to claim 1, wherein the shaping tool comprises at least one bar adapted to be axially inserted in a respective slot, and wherein said hot shaping step comprises axially inserting said at least one bar in said respective slot.

4. Method according to claim 3, wherein the slot is intended to house several bar conductors of said bar winding and wherein the shaping tool includes a number of bars equal to the number of bar conductors intended to be housed inside the slot.

5. Method according to claim 3, wherein the hot shaping step comprises an operation of inserting said at least one bar inside a respective slot by making the bar move forward with respect to the stator core and a subsequent operation of freeing the slot from said bar by making the bar move backward with respect to the stator core.

6. Method according to claim 3, wherein said bar has a length greater than an axial extension depth of the slot.

7. Method according to claim 1, further comprising a step of flaring an end portion of said insulating sheet projecting from the stator core, the flaring step comprising inserting a conical flaring element inside said projecting end portion, and wherein the shaping tool is slidably received inside a seat which terminates with said conical flaring element, the shaping step comprising sliding said shaping element inside said seat.

* * * * *